(12) United States Patent
Kishima

(10) Patent No.: US 9,868,478 B2
(45) Date of Patent: Jan. 16, 2018

(54) VEHICLE REAR PORTION STRUCTURE

(71) Applicant: TOYOTA JIDOSHA KABUSHIKI KAISHA, Toyota-shi, Aichi-ken (JP)

(72) Inventor: Fumihiko Kishima, Kounan (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/079,443

(22) Filed: Mar. 24, 2016

(65) Prior Publication Data

US 2016/0318560 A1  Nov. 3, 2016

(30) Foreign Application Priority Data

Apr. 28, 2015  (JP) .................................. 2015-092330

(51) Int. Cl.
 *B62D 35/00*  (2006.01)
 *B60Q 1/30*  (2006.01)
 *B60Q 1/26*  (2006.01)
 *B62D 37/02*  (2006.01)
 *B60Q 1/00*  (2006.01)

(52) U.S. Cl.
 CPC .......... *B62D 35/007* (2013.01); *B60Q 1/0017* (2013.01); *B60Q 1/2661* (2013.01); *B60Q 1/30* (2013.01); *B62D 37/02* (2013.01); *B62D 35/00* (2013.01)

(58) Field of Classification Search
 CPC ...... B62D 35/007; B62D 35/00; B62D 37/02; B60Q 1/2661; B60Q 1/30; B60Q 1/0017
 USPC ........................................................ 296/180.1
 See application file for complete search history.

(56) References Cited

U.S. PATENT DOCUMENTS 7,322,638 B2 *  1/2008  Larson ................. B62D 35/007
                                                      180/903

FOREIGN PATENT DOCUMENTS

JP   2010-143522 A    7/2010
JP   2013-216247 A   10/2013

* cited by examiner

*Primary Examiner* — Joseph D Pape
*Assistant Examiner* — Dana Ivey
(74) *Attorney, Agent, or Firm* — Oliff PLC

(57) ABSTRACT

A vehicle rear portion structure includes: a moving portion that is disposed at a vehicle rear end portion at an inner side of each of two corner portions of the vehicle width direction, the moving portion including a wall face that extends in a vehicle front-and-rear direction and a vehicle up-and-down direction, and the moving portion being movable to a stowed position and to a protruded position at which the moving portion protrudes from the stowed position to a rear side in the vehicle front-and-rear direction; a control section that moves the moving portion from the stowed position to the protruded position in a case in which a speed of the vehicle exceeds a specific speed; and a light-emitting portion that is disposed at the moving portion and emits light to the rear side in the vehicle front-and-rear direction relative to the vehicle rear end portion.

4 Claims, 13 Drawing Sheets

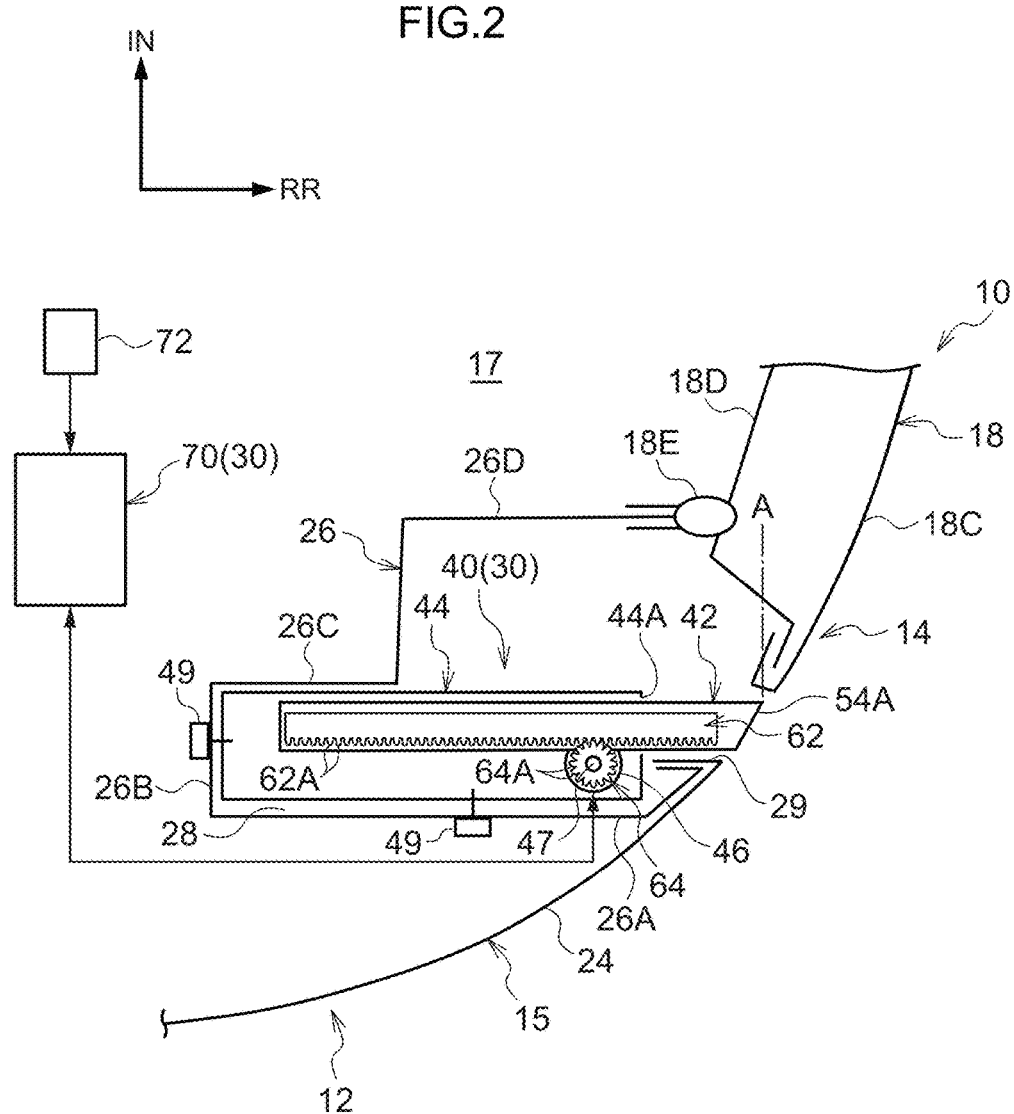

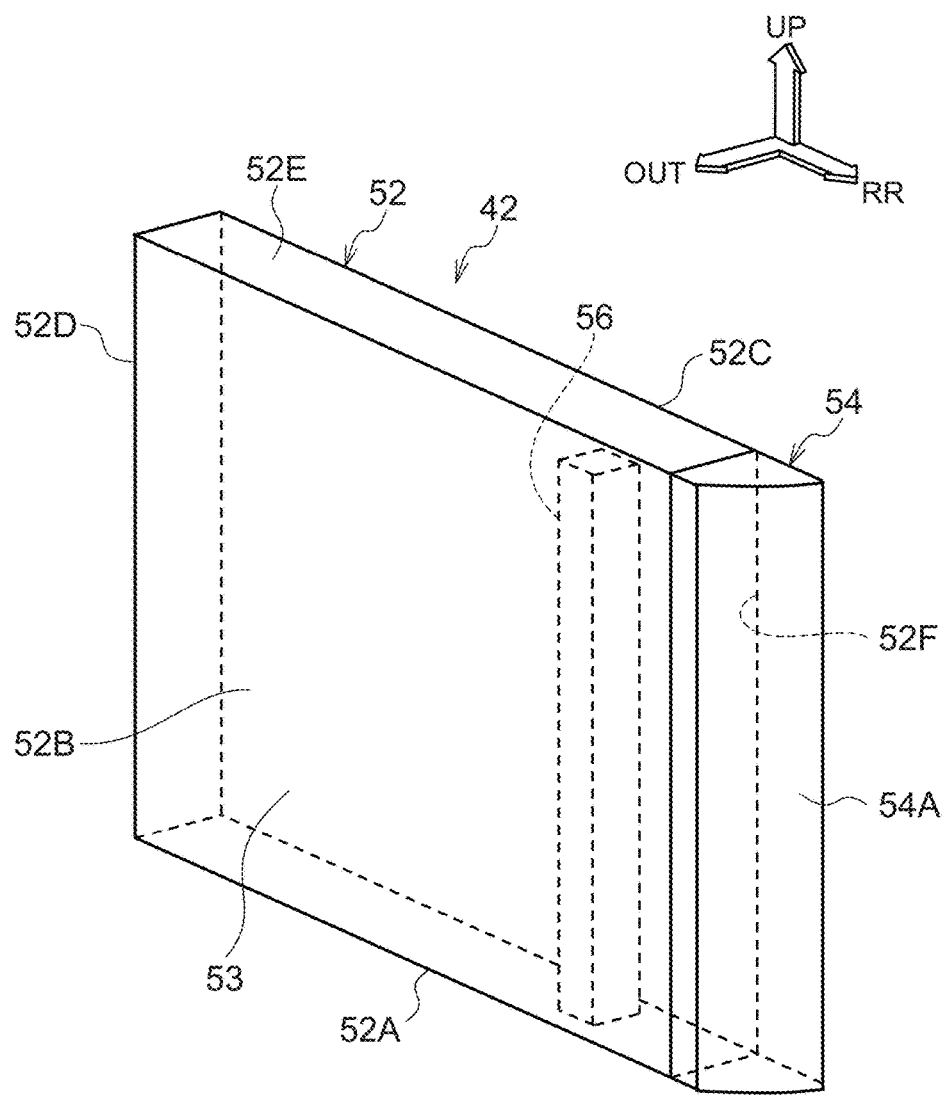

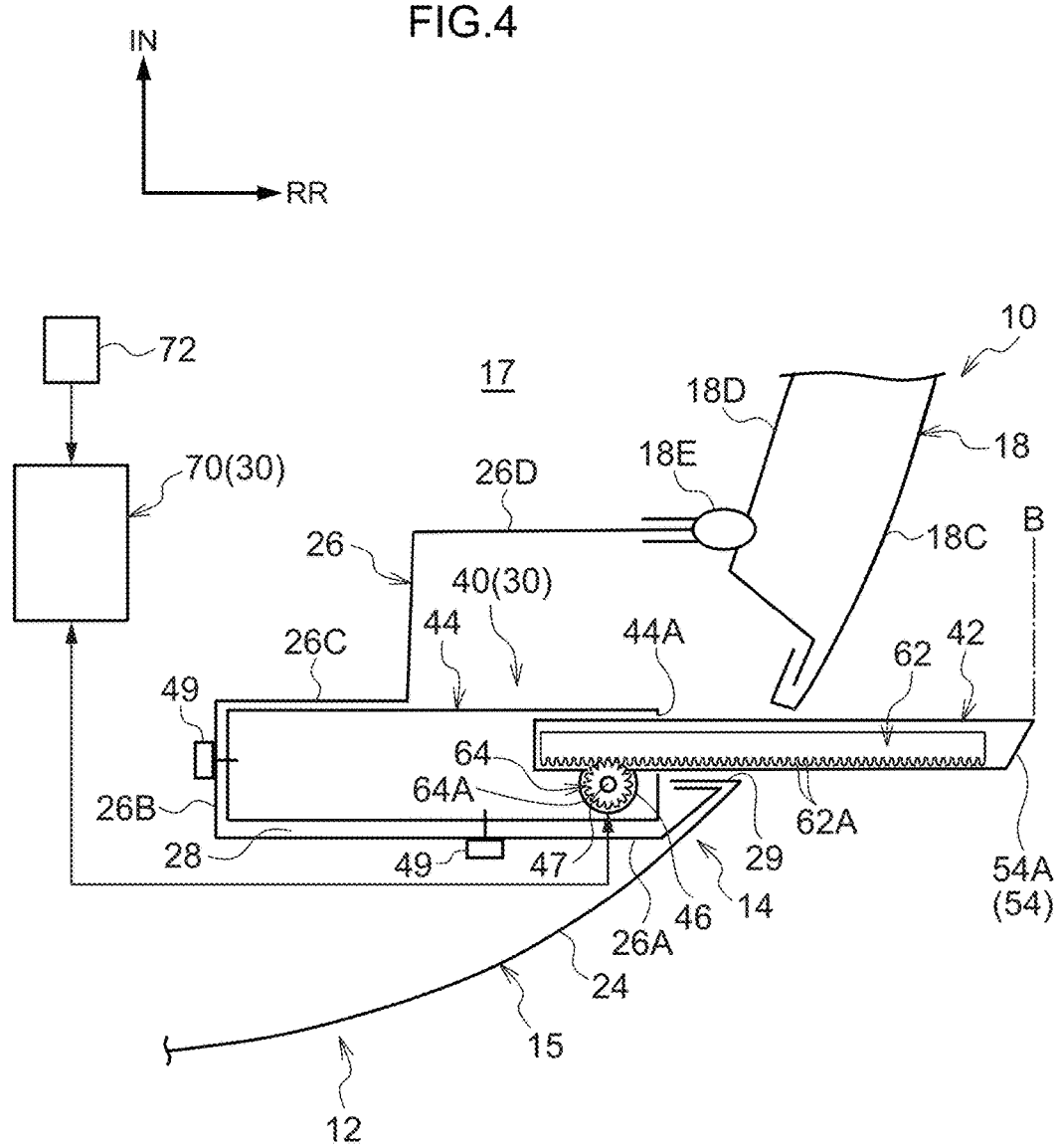

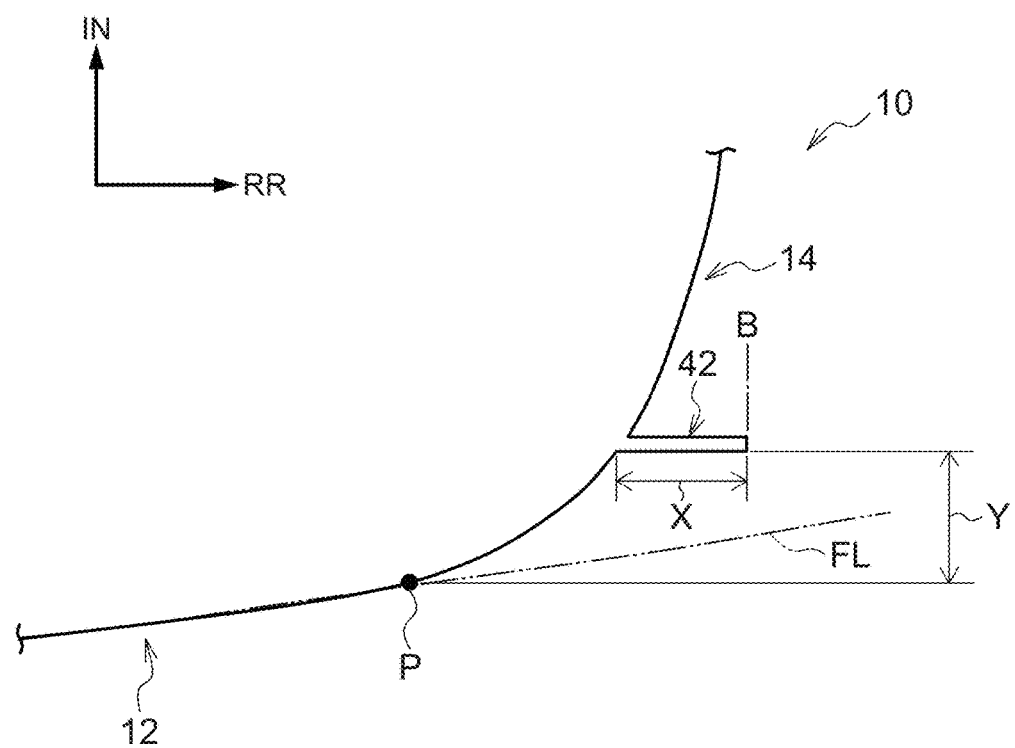

VEHICLE REAR PORTION STRUCTURE

CROSS-REFERENCE TO RELATED APPLICATIONS

This application is based on and claims priority under 35 USC 119 from Japanese Patent Application No. 2015-092330 filed on Apr. 28, 2015, the disclosure of which is incorporated by reference herein.

BACKGROUND

Technical Field

The present disclosure relates to a vehicle rear portion structure.

Related Art

Japanese Patent Application Laid-Open (JP-A) No. 2010-143522 discloses a vehicle rear portion structure that includes a right movable spoiler, a left movable spoiler, an upper movable spoiler and a lower movable spoiler that are movable to the vehicle body rear. In this vehicle rear portion structure, the right movable spoiler and the left movable spoiler protrude from a vehicle body rear portion to the vehicle body rear at width direction outer sides of the vehicle body. In other words, this vehicle rear portion structure is provided with movable spoilers that move in the vehicle front-and-rear direction at each of two vehicle width direction end portions.

However, in a structure according to the technology described above, the movable spoilers that protrude from the vehicle rear end portions may block portions of light from light-emitting portions at the vehicle rear end portions. Thus, it is difficult to improve visibility of the light-emitting portions from behind the vehicle. In addition, in the technology described above there is no means for causing the presence of the movable spoilers to be recognized. Thus, it is difficult to improve visibility of the movable spoilers. Therefore, in a vehicle in which moving portions that can be protruded to the rear side in the vehicle front-and-rear direction are provided at a vehicle rear end portion, there is scope for improvement in regard to improving the visibilities of light-emitting portions and the moving portions at the vehicle rear end portion.

SUMMARY

In consideration of the circumstances described above, the present disclosure provides a vehicle rear portion structure that, in a vehicle in which a moving portion for regulating airflow that can be protruded toward the rear side of the vehicle in a vehicle front-and-rear direction is provided at a vehicle rear end portion, may improve visibilities of a light-emitting portion and the moving portion at the vehicle rear end portion.

One aspect of the present disclosure is a vehicle rear portion structure including: a moving portion that is disposed at a vehicle rear end portion at a vehicle width direction inner side of each of two corner portions of the vehicle width direction, the moving portion including a wall face that extends in a vehicle front-and-rear direction and a vehicle up-and-down direction, and the moving portion being movable to a stowed position at which the moving portion is stowed in the vehicle rear end portion and to a protruded position at which the moving portion protrudes from the stowed position to a rear side in the vehicle front-and-rear direction; a control section that moves the moving portion from the stowed position to the protruded position in a case in which a speed of the vehicle exceeds a specific speed; and a light-emitting portion that is disposed at the moving portion and emits light to the rear side in the vehicle front-and-rear direction relative to the vehicle rear end portion.

In the present aspect, when the speed of the vehicle exceeds the specific speed, the control section causes the moving portion stowed at the stowed position of the vehicle rear end portion to move from the stowed position to the protruded position. As a result, the moving portion protrudes to the rear side in the vehicle front-and-rear direction relative to the vehicle rear end portion, at the vehicle width direction inner side of each of two corner portions of the vehicle rear end portion in the vehicle width direction. In the state in which the moving portion is protruded from the vehicle rear end portion, the light-emitting portion emits light to the rear side in the vehicle front-and-rear direction.

Now, in a structure in which another light-emitting portion is not provided at a location of the vehicle adjacent to the moving portion, the light-emitting portion at the moving portion functions as a light-emitting portion of the vehicle rear end portion when the moving portion is at the stowed position and at the protruded position. Therefore, visibility of the light-emitting portion at the vehicle rear end portion when viewed from behind the vehicle is improved. Moreover, because the light-emitting portion is provided at the moving portion, the presence of the moving portion can be recognized from behind the vehicle. Thus, visibility of the moving portion is improved.

On the other hand, in a structure in which another light-emitting portion is provided at a location of the vehicle that is adjacent to the moving portion, the light-emitting portion at the moving portion functions as a portion of the another light-emitting portion when the moving portion is at the protruded position. Therefore, even if a portion of the light from the another light-emitting portion is blocked when the moving portion is at the protruded position, the light from the light-emitting portion at the moving portion can be seen. Therefore, the visibility of the light-emitting portions at the vehicle rear end portion when viewed from behind the vehicle is improved. Moreover, because the light-emitting portion is provided at the moving portion, the presence of the moving portion can be recognized from behind the vehicle. Thus, the visibility of the moving portion is improved.

In the present aspect, the moving portion may include a light guide member that is exposed to a vehicle outside of the vehicle rear end portion when the moving portion is disposed at the stowed position, the light guide member guiding light from the light-emitting portion to the rear side in the vehicle front-and-rear direction.

In the structure described above, in the state in which the moving portion is disposed at the stowed position of the vehicle rear end portion, the light guide member is exposed to the vehicle outside of the vehicle rear end portion. Consequently, the light-emitting portion and light guide member may be utilized as, for example, a tail stop lamp and a rear turn signal lamp. That is, there is no need to provide the tail stop lamp and rear turn signal lamp in addition to the light-emitting portion.

Therefore, a number of components in the vehicle may be reduced.

In the present aspect, the vehicle rear end portion may include a luggage door, the moving portion may be disposed at the luggage door via a turning axle, an axial direction of which is in the vehicle up-and-down direction, and the control section may cause the moving portion to turn about the turning axle and move from the stowed position to the protruded position.

In the structure described above, the moving portion turns about the turning axle to move from the stowed position to the protruded position. Therefore, a length in the vehicle front-and-rear direction of a space required for stowing the moving portion may be made shorter than in a structure in which a moving portion of the same size translates along the vehicle front-and-rear direction.

Therefore, luggage space may be thoroughly assured.

In the present aspect, the control section may cause the moving portion to translate in the vehicle front-and-rear direction and move from the stowed position to the protruded position.

In this structure, the movement operation is simple and is unlikely to interfere with other components.

As described above, according to the vehicle rear portion structure of the present disclosure, in a vehicle in which a moving portion for regulating airflow that can be protruded toward the rear side in the vehicle front-and-rear direction is provided at a vehicle rear end portion, visibilities of a light-emitting portion and the moving portion at the vehicle rear end portion may be improved.

BRIEF DESCRIPTION OF THE DRAWINGS

Exemplary embodiments of the present disclosure will be described in detail based on the following figures, wherein:

FIG. 2 is a schematic structural diagram illustrating, in a vehicle plan view, a state in which a moving body of the vehicle rear portion structure in accordance with the first exemplary embodiment is disposed at a stowed position.

FIG. 3 is a perspective view of the moving body in accordance with the first exemplary embodiment.

FIG. 4 is a schematic structural diagram illustrating, in a vehicle plan view, a state in which the moving body of the vehicle rear portion structure in accordance with the first exemplary embodiment is disposed at a protruded position.

FIG. 7 is a descriptive diagram illustrating the protruded position and a protrusion length of the moving body relative to a representative point of the vehicle rear end portion in accordance with the first exemplary embodiment.

DETAILED DESCRIPTION

First Exemplary Embodiment

Figure 1:
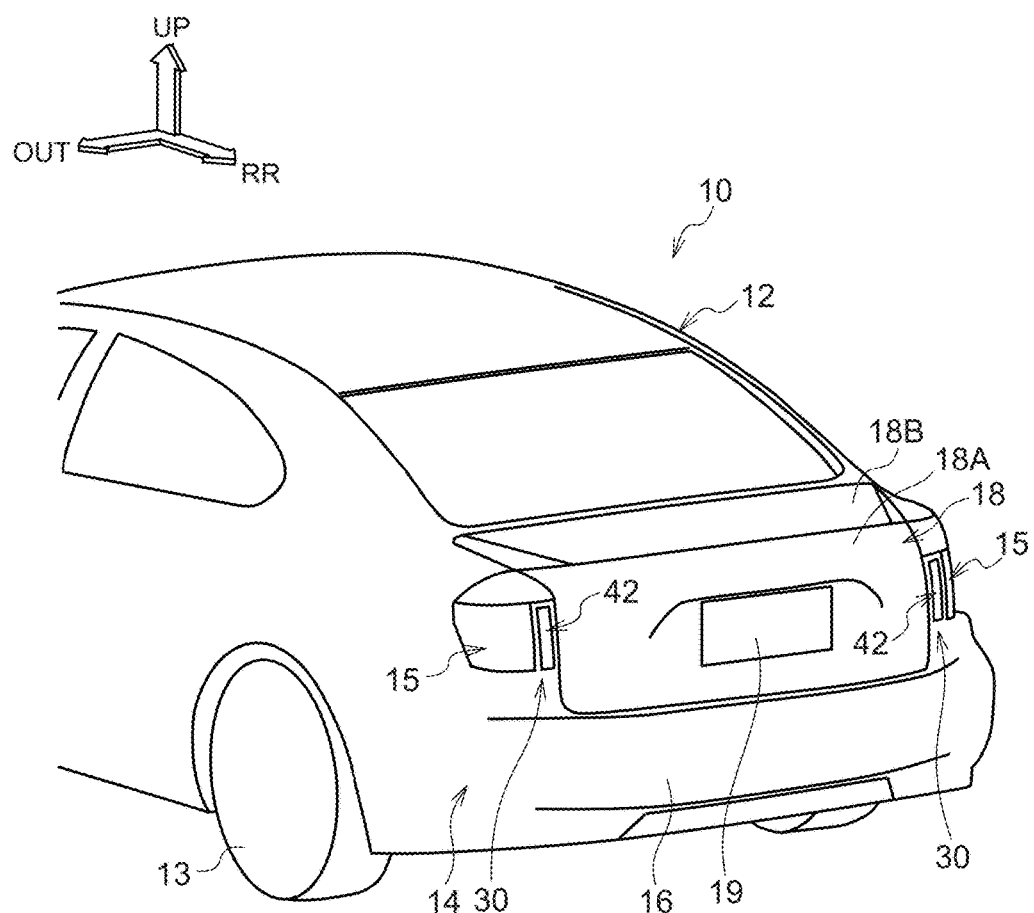
FIG. 1 is a perspective view, viewed from a vehicle rear end portion side, of a vehicle in which a vehicle rear portion structure in accordance with a first exemplary embodiment is applied.

Herebelow, a first exemplary embodiment of a vehicle rear portion structure according to the present disclosure is described. An arrow RR that is illustrated in the drawings indicates a vehicle rear side, an arrow UP indicates a vehicle upper side, an arrow OUT indicates a vehicle width direction outer side, and an arrow IN indicates a vehicle width direction inner side.

Overall Structure of the Vehicle

FIG. 1 illustrates a vehicle 10 according to the first exemplary embodiment. A rear end portion in the vehicle front-and-rear direction of a vehicle body 12 of the vehicle 10 is collectively referred to as a vehicle rear end portion 14. The vehicle rear end portion 14 includes a rear bumper 16 provided at the vehicle body 12, a rear end portion in the vehicle front-and-rear direction of a luggage door 18, and vehicle rear portion structures 30. Details of the vehicle rear portion structures 30 are described below.

Portions of the vehicle rear end portion 14 that are at the rear end portion of the vehicle body 12 in the vehicle front-and-rear direction, at each of two end portions in the vehicle width direction, and at substantially the same height as the luggage door 18 in the vehicle up-and-down direction are referred to as corner portions 15. In the vehicle 10, as an example, rear turn signal lamps and tail stop lamps are not provided at the corner portions 15 but LED lamps 56 and lamp covers 54 (see FIG. 3), which are described below, are provided. The LED lamps 56 and lamp covers 54 function as rear turn signal lamps and tail stop lamps.

The luggage door 18 includes a vertical wall portion 18A and an upper wall portion 18B. A license plate 19 that extends in the vehicle up-and-down direction is mounted at the vertical wall portion 18A. The upper wall portion 18B extends toward the vehicle front side from a vehicle up-and-down direction upper end portion of the vertical wall portion 18A. The luggage door 18 opens and closes a luggage space 17 provided in the vehicle body 12 (see FIG. 2). In this example, the vehicle rear end portion 14 is structured with left-right symmetry with respect to the vehicle width direction center. Accordingly, in the following descriptions, structures at the left side relative to the vehicle width direction center of the vehicle rear end portion 14 are described and descriptions related to structures at the right side of the vehicle rear end portion 14 are omitted.

As illustrated in FIG. 2, the luggage door 18 includes a door outer panel 18C and a door inner panel 18D. Portions of the door outer panel 18C and portions of the door inner panel 18D are joined together.

Each corner portion 15 includes an outer panel 24 and an inner panel 26. The outer panel 24 is disposed at the outer side in the vehicle width direction, and the inner panel 26 is disposed at the inner side in the vehicle width direction. As an example, the outer panel 24 is curved so as to protrude to the opposite side from the side at which the vehicle rear portion structure 30 is disposed, as viewed in the vehicle up-and-down direction. The inner panel 26 is, for example, inflected at plural locations as viewed in the vehicle up-and-down direction of the vehicle 10 (in the vehicle plan view), and includes an upright wall 26A, an upright wall 26B, an upright wall 26C and an upright wall 26D that stand upright along the vehicle up-and-down direction.

The upright wall 26A is disposed along the vehicle front-and-rear direction. The upright wall 26B extends to the inner side in the vehicle width direction from a vehicle front end portion of the upright wall 26A. The upright wall 26C extends to the rear side in the vehicle front-and-rear direction from a vehicle width direction inner side end portion of the upright wall 26B. The upright wall 26D extends along the vehicle front-and-rear direction at a location that is separated to the inner side in the vehicle width direction from the upright wall 26C. A sealing member 18E fabricated of rubber is attached to a vehicle rear end portion of the upright wall 26D. The sealing member 18E is in contact with the door inner panel 18D and improves sealing of the luggage space 17.

A region enclosed by the upright wall 26A, upright wall 26B and upright wall 26C is referred to as a space portion 28. The space portion 28 is open to the rear side in the vehicle front-and-rear direction. A region at which the space portion 28 is open at a vehicle rear end portion of the outer panel 24 is referred to as an aperture portion 29.

Principal Structures

Now, the vehicle rear portion structures 30 are described.

Each vehicle rear portion structure 30 includes a moving unit 40 and a control unit 70 that serves as an example of a control section.

Moving Unit

The moving unit 40 includes a moving body 42, which serves as an example of a moving portion, a stowing portion 44 that stows the moving body 42, and a motor 46 that causes the moving body 42 to be stowed in and protruded from the stowing portion 44. As is described in detail below, the moving body 42 is a member for regulating airflow at the vehicle rear. The moving unit 40 is disposed at the vehicle width direction inner side of the corner portion 15 (of both of the corner portions 15) in the vehicle width direction. Specifically, the moving unit 40 is provided in the vicinity of a boundary between the luggage door 18 and the vehicle body 12.

Moving Body

As illustrated in FIG. 3, the moving body 42 includes a hollow housing 52, the lamp cover 54 and the LED lamp 56. The lamp cover 54 is mounted at the vehicle rear end of the housing 52 and serves as an example of a light guide member. The LED lamp 56 is mounted at the inside of the housing 52 and serves as an example of a light-emitting portion. The meaning of the term "LED" includes light-emitting diodes.

The housing 52 is a board-shaped box body that is disposed with a thickness direction thereof in the vehicle width direction. The housing 52 is constituted of, for example, a black polycarbonate resin. Viewed in the vehicle width direction, the housing 52 is formed in a rectangular shape with a shorter direction in the vehicle up-and-down direction and a longer direction in the vehicle front-and-rear direction. Specifically, the housing 52 includes a lower wall 52A, a side wall 52B, a side wall 52C, a front wall 52D and an upper wall 52E. Thicknesses of the lower wall 52A, side wall 52B, side wall 52C, front wall 52D and upper wall 52E are not illustrated in FIG. 3.

Viewed in the vehicle up-and-down direction, the lower wall 52A is formed in a rectangular shape. The side wall 52B and the side wall 52C stand upright in the vehicle up-and-down direction at each of two vehicle width direction end portions of the lower wall 52A. The side wall 52B includes a side face 53 disposed at the vehicle width direction outer side thereof. The side face 53 is an example of a wall face that extends in the vehicle front-and-rear direction and the vehicle up-and-down direction. The front wall 52D stands upright in the vehicle up-and-down direction at a vehicle front end portion of the lower wall 52A. The upper wall 52E has substantially the same size and shape as the lower wall 52A, and opposes the lower wall 52A in the vehicle up-and-down direction. An aperture portion 52F is formed at the rear end in the vehicle front-and-rear direction of the housing 52. The aperture portion 52F opens to the rear side in the vehicle front-and-rear direction.

Racks 62 (see FIG. 2), which are described below, are integrally provided at the lower face in the vehicle up-and-down direction of the lower wall 52A and the upper face in the vehicle up-and-down direction of the upper wall 52E. The racks 62 are not shown in the drawing of FIG. 3. A protrusion portion, which is not shown in the drawings, is formed at the housing 52. The protrusion portion comes into contact with a periphery edge portion of an aperture portion 44A, which is described below, of the stowing portion 44 (see FIG. 2). The protrusion portion blocks disengagement of the moving body 42 from the stowing portion 44.

The lamp cover 54 is, for example, a column-shaped body whose length in the vehicle width direction is substantially the same as the length in the vehicle width direction of the housing 52, and whose length in the vehicle up-and-down direction is substantially the same as the length in the vehicle up-and-down direction of the housing 52. The lamp cover 54 is fixed to the rear end in the vehicle front-and-rear direction of the housing 52 by adhesion or the like and covers the aperture portion 52F. The lamp cover 54 is constituted of, for example, a colorless, transparent polycarbonate resin. In a state in which the moving body 42 is disposed at a stowed position A (see FIG. 2), which is described below, the lamp cover 54 is exposed at the vehicle outside of the vehicle rear end portion 14 (see FIG. 2).

An emission face 54A, through which light from the LED lamp 56 is emitted, is formed at the rear end in the vehicle front-and-rear direction of the lamp cover 54. That is, the lamp cover 54 is structured to guide light from the LED lamp 56 to the emission face 54A such that the light of the LED lamp 56 is emitted through the emission face 54A to the rear side in the vehicle front-and-rear direction. Viewed in the vehicle up-and-down direction, the emission face 54A is, for example, a curved surface that curves so as to protrude to the opposite side from the side thereof at which the LED lamp 56 is disposed and such that a vehicle width direction inner end portion of the emission face 54A is disposed at the rear side in the vehicle front-and-rear direction relative to an outer end portion of the same.

As an example, the upper side in the vehicle up-and-down direction of the lamp cover 54 is colored red and the lower side is colored orange. A boundary face between the red and orange parts of the lamp cover 54 is not shown in FIG. 3.

The LED lamp 56 is an aggregation of LED light sources plurally arranged in the vehicle up-and-down direction, which are not shown in the drawings. The LED lamp 56 emits (illuminates) lights to the rear side in the vehicle front-and-rear direction. Where the LED lamp 56 opposes the red part of the lamp cover 54 in the vehicle front-and-rear direction, the LED lamp 56 is structured with a red LED, and where the LED lamp 56 opposes the orange part of the lamp cover 54 in the vehicle front-and-rear direction, the LED lamp 56 is structured with an orange LED. That is, as an example in the present exemplary embodiment, a tail stop lamp is structured by the red parts of the LED lamp 56 and the lamp cover 54, and a rear turn signal lamp is structured by the orange parts of the LED lamp 56 and the lamp cover 54. Lighting and extinguishing of the red part of the LED lamp 56 and flashing and extinguishing of the orange part of the LED lamp 56 are controlled by the control unit 70 (see FIG. 2) on the basis of operations by a vehicle occupant.

As illustrated in FIG. 2, the racks 62 extend in the vehicle front-and-rear direction over the length of the moving body 42. Plural tooth portions 62A in which there are repeated indentations and protrusions toward the vehicle width direction outer side are formed at vehicle width direction outer end portions of the racks 62. The plural tooth portions 62A mesh with plural tooth portions 64A of pinions 64, which are described below.

Stowing Portion

The stowing portion 44 is a rectangular cuboid-shaped box body. Viewed in the vehicle up-and-down direction, the stowing portion 44 is formed in a rectangular shape whose shorter direction is in the vehicle width direction and whose longer direction is in the vehicle front-and-rear direction. The aperture portion 44A is formed in a rear end face in the vehicle front-and-rear direction of the stowing portion 44. The aperture portion 44A opens in the vehicle front-and-rear direction. This stowing portion 44 structures a portion of the vehicle rear end portion 14.

As an example, a portion of the moving body 42, the motor 46 that is described below, and the pinions 64 are stowed inside the stowing portion 44. The stowing portion 44 is disposed in the space portion 28 described above. For example, the stowing portion 44 is fixed to the upright wall 26A and the upright wall 26B by plural bolts 49. The moving body 42 is guided in the vehicle front-and-rear direction by a guide member that is not shown in the drawings and that is provided along the vehicle front-and-rear direction inside the stowing portion 44. That is, the moving body 42 is made movable in the vehicle front-and-rear direction.

Motor

The motor 46 includes a shaft 47, which is a rotor shaft whose axial direction is in the vehicle up-and-down direction. Two pinions 64 are provided at the shaft 47, spaced apart in the vehicle up-and-down direction. The two pinions 64 are disposed to coincide with the heights of the upper and lower racks 62 of the moving body 42. The motor 46 starts driving and stops driving in accordance with commands from the control unit 70. The motor 46 turns the pinions 64 in either a forward turning direction or a reverse turning direction, so as to protrude a portion of the moving body 42 to the outside from the stowing portion 44 or so as to stow the portion of the moving body 42 in the stowing portion 44. The motor 46, the pinions 64 and the racks 62 are encompassed by the example of the control section.

Positions of the Moving Body

A position of the moving body 42 in a state in which the moving body 42, from a vehicle front-and-rear direction central portion to a front end portion thereof, is stowed in the stowing portion 44 and the emission face 54A is disposed at the aperture portion 29 is referred to as "the stowed position A". In FIG. 2, the stowed position A is marked at a position at the vehicle rear end of the moving body 42. On the other hand, as illustrated in FIG. 4, a position of the moving body 42 in a state in which the moving body 42, from the vehicle front-and-rear direction central portion to a rear end portion thereof, is protruded to the rear side in the vehicle front-and-rear direction relative to the aperture portion 29 is referred to as "the protruded position B". In FIG. 4, the protruded position B is marked at the position at the vehicle rear end of the moving body 42.

FIG. 7 schematically illustrates a portion of the vehicle rear end portion 14 (a region at which the moving body 42 is provided and neighboring portions) in the state in which the moving body 42 is disposed at the protruded position B. In FIG. 7, the vehicle width direction outer end of the vehicle rear end portion 14 is represented by a representative point P. The representative point P is a position at which, in a case in which the vehicle 10 is running at about 100 km/h in a wind tunnel test, an airflow FL flowing along a side face at each of the two vehicle width direction end portions of the vehicle body 12 (a side face flow illustrated by the two-dot chain line FL) separates from the vehicle body 12. The moving body 42 is disposed at the vehicle width direction inner side relative to the representative point P.

Control Unit

The control unit 70 illustrated in FIG. 2 is configured so as to control operations of respective portions of the vehicle 10. The control unit 70 is electronically connected to the motor 46 and to a speed sensor 72 that detects running speeds (hereinafter referred to as "the vehicle speed") of the vehicle 10. The motor 46 starts driving and stops driving of the pinions 64 in accordance with command information from the control unit 70 (information about whether to drive or not). The motor 46 is configured to send rotation amount information of the pinions 64 to the control unit 70. The speed sensor 72 is configured to detect the vehicle speed on the basis of rotations per unit time of a tire 13 of the vehicle 10 (see FIG. 1) and an external diameter of the tire, and to send vehicle speed information to the control unit 70.

In a stopped state in which the vehicle 10 is not running (an initial state) or a low-speed running state in which the vehicle speed of the vehicle 10 is not more than a pre-specified specific speed, the control unit 70 drives and stops the motor 46 such that the moving body 42 is disposed at the stowed position A. In the present exemplary embodiment, as an example, the specific speed is set to 20 km/h, but the specific speed may be an alternative speed. In a high-speed running state in which the vehicle speed of the vehicle 10 is above the specific speed, the control unit 70 drives and stops the motor 46 so as to move the position of the moving body 42 from the stowed position A to the protruded position B (see FIG. 4).

Airflows Around an Ordinary Vehicle

Figure 5A:
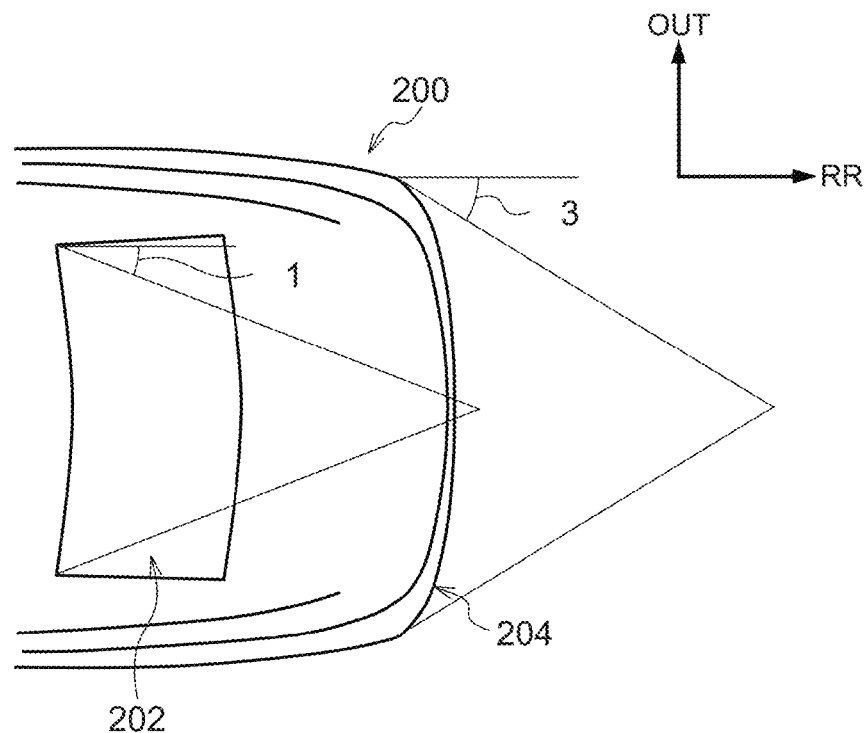
FIG. 5A and FIG. 5B are descriptive diagrams illustrating recirculation angles of airflows around the vehicle in accordance with the first exemplary embodiment.
Figure 5B:
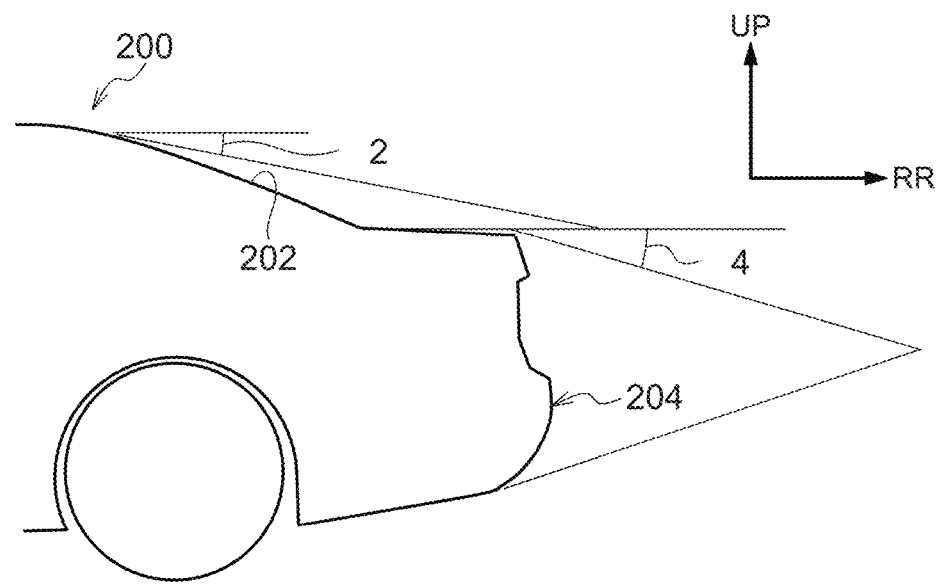

As illustrated in FIG. 5A and FIG. 5B, a vehicle rear end portion of an ordinary sedan-type vehicle 200 is formed in a shape that is short in the vehicle up-and-down direction and long in the vehicle width direction. At the rear side relative to a vehicle rear end portion of the vehicle 200, airflows with high speeds, which flow along side faces at both of vehicle width direction end portions and an upper face and lower face of the vehicle up-and-down direction of the vehicle 200, flow together toward the vehicle width direction center where air pressure is low.

As illustrated in FIG. 5A, in which the vehicle 200 is viewed in the vehicle up-and-down direction, airflow directions towards the vehicle width direction center are represented by angles relative to the vehicle front-and-rear direction. Here, an airflow angle at a rear glass 202 of the vehicle 200 is represented by θ1° and an airflow angle at a vehicle width direction end portion at the rear end portion of the vehicle 200 is represented by θ3°. As illustrated in FIG. 5B, in which the vehicle 200 is viewed in the vehicle width direction, airflow directions towards the vehicle rear are represented by angles relative to the vehicle front-and-rear direction. An airflow angle at the rear glass 202 of the vehicle 200 is represented by θ2° and an airflow angle at the rear end portion of the vehicle 200 is represented by θ4°. Accordingly, θ1>θ2 and θ3>θ4. Thus, recirculation of the airflows from the side faces at the two vehicle width direction end portions of the vehicle 200 is large. Note that this is a schematically descriptive example and does not mean that airflows actually flow together at a single point.

Airflows Around a Vehicle of a Comparative Example

Figure 13:
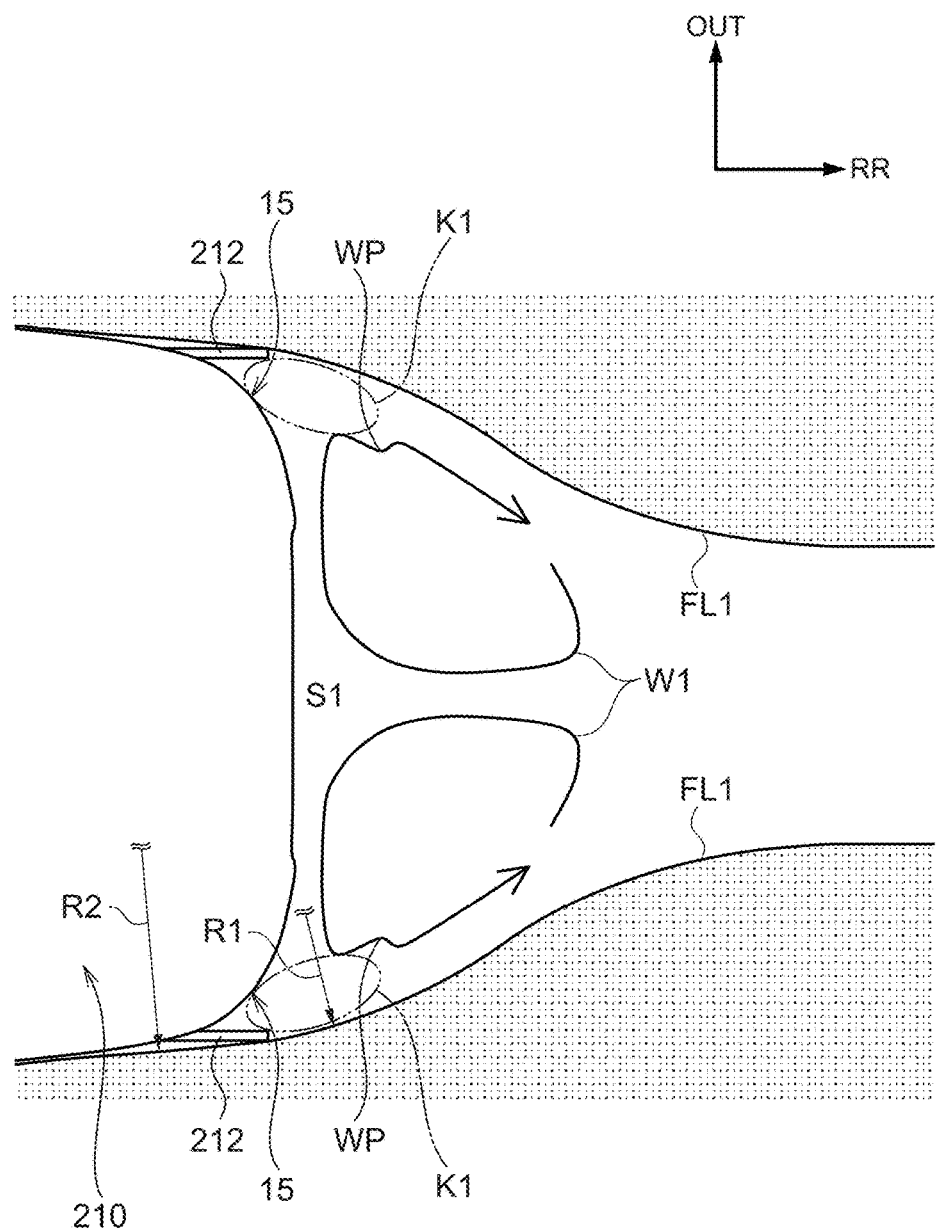
FIG. 13 is a descriptive diagram illustrating a state of airflows and rear face eddies in the vicinity of a vehicle rear end portion in accordance with a comparative example.

FIG. 13 schematically illustrates, in a state viewed in a vehicle up-and-down direction, airflows and rear face eddies in the vicinity of a vehicle rear end portion during running of a vehicle 210, which is a comparative example for comparison with the vehicle 10 according to the present embodiment (see FIG. 1). Portions that are the same as in the vehicle 10 are assigned the same reference symbols as in the vehicle 10 and are not described.

The vehicle 210 is a structure in which a board member 212 protruding to the rear side in the vehicle front-and-rear direction is provided at the vehicle width direction outer side of each corner portion 15. A thickness direction of the board member 212 is in the vehicle width direction. In FIG. 13, the airflows closest to the vehicle 210 are represented by solid lines as flow lines FL1; regions of other airflows are represented by stippling. Rear face eddies are represented by arrows marked W1.

As illustrated in FIG. 13, the rear face eddies W1 occur in a region Si at the rear side in the vehicle front-and-rear direction than the vehicle rear end portion of the vehicle 210 so as to be symmetrical between left and right relative to the vehicle width direction center (between the top and bottom of FIG. 13).

In the vehicle 210 according to the comparative example, distances between locations at which the rear face eddies W1 occur and locations at which the board members 212 protrude are long (i.e., they are distantly separated). Therefore, it is harder for the airflows along the flow lines FL1 along the side faces of the board members 212 to flow together towards the rear face eddies W1 and shear energy is less likely to be transmitted from the airflows along the flow lines FL1 to the rear face eddies W1. Therefore, flows in portions of the rear face eddies W1 are unstable. In FIG. 13, locations at which the flows are unstable are represented by recessed shapes of portions (marked WP) of the arrows of the rear face eddies W1.

A radius of curvature R1 of each flow line FL1 at the rear side in the vehicle front-and-rear direction relative to the board member 212 (the region K1 circled by a two-dot chain line) is smaller than a radius of curvature R2 of the flow line FL1 at a side face of the board member 212. According to the principles of flow line curvature, the radius of curvature of the flow line FL1 being smaller signifies that the pressure is lower. For these reasons, at the vehicle 210 according to the comparative example, the air pressure in the region S1 is lower than in other regions. Thus, the vehicle 210 tends to be pulled to the rear side in the vehicle front-and-rear direction. That is, air resistance of the vehicle 210 is large.

Operation and Effects

Now, operation and effects of the vehicle rear portion structure 30 according to the present exemplary embodiment are described.

As illustrated in FIG. 2, when the vehicle 10 is stopped or running at not more than the specific speed, each moving body 42 is disposed at the stowed position A and the emission face 54A is exposed at the vehicle outside of the vehicle rear end portion 14. In this state, the control unit 70 controls lighting, flashing and extinguishing of the red and orange parts of the LED lamp 56 (see FIG. 3) on the basis of operations by a vehicle occupant. That is, the moving body 42 functions as a tail stop lamp and a rear turn signal lamp. Because the emission face 54A is exposed at the vehicle outside of the vehicle rear end portion 14, conditions of visibility of the lamp (up to 45° to the inner side and 80° to the outer side in the vehicle width direction) are assured.

When the vehicle 10 is stopped or running at not more than the specific speed, proportional increases in air resistance acting on the vehicle 10 with respect to vehicle speeds are small. Therefore, even though the moving bodies 42 are each disposed at the stowed position A, the magnitude of air resistance acting on the vehicle 10 has little effect on the running of the vehicle 10. When the vehicle 10 is moving to the rear side (reversing), because each moving body 42 is disposed at the stowed position A, the moving body 42 may be prevented from coming into contact with an object at the rear side of the vehicle 10. Furthermore, when the vehicle 10 is stopped, because each moving body 42 is disposed at the stowed position A, the moving bodies 42 do not impede operations when the luggage door 18 is opened and luggage is put into or taken out of the luggage space 17.

Hence, as illustrated in FIG. 4, if the speed sensor 72 detects that the vehicle speed of the vehicle 10 is above the specific speed, the control unit 70 drives each motor 46, causing the pinions 64 to turn forward and moving the position of the moving body 42 from the stowed position A to the protruded position B. As a result, the moving bodies 42 protrude to the rear side in the vehicle front-and-rear direction than the vehicle rear end portion 14, at the vehicle width direction inner sides of the corner portions 15.

In the state in which the moving body 42 is disposed at the protruded position B, the emission face 54A is exposed at the vehicle outside of the vehicle rear end portion 14. Consequently, the moving body 42 functions as the tail stop lamp and the rear turn signal lamp. Moreover, because the emission face 54A is protruding to the vehicle outside of the vehicle rear end portion 14, the emission face 54A is easy to see from behind the vehicle 10. Thus, visibility of the tail stop lamp and the rear turn signal lamp from behind the vehicle 10 may be improved.

Figure 6:
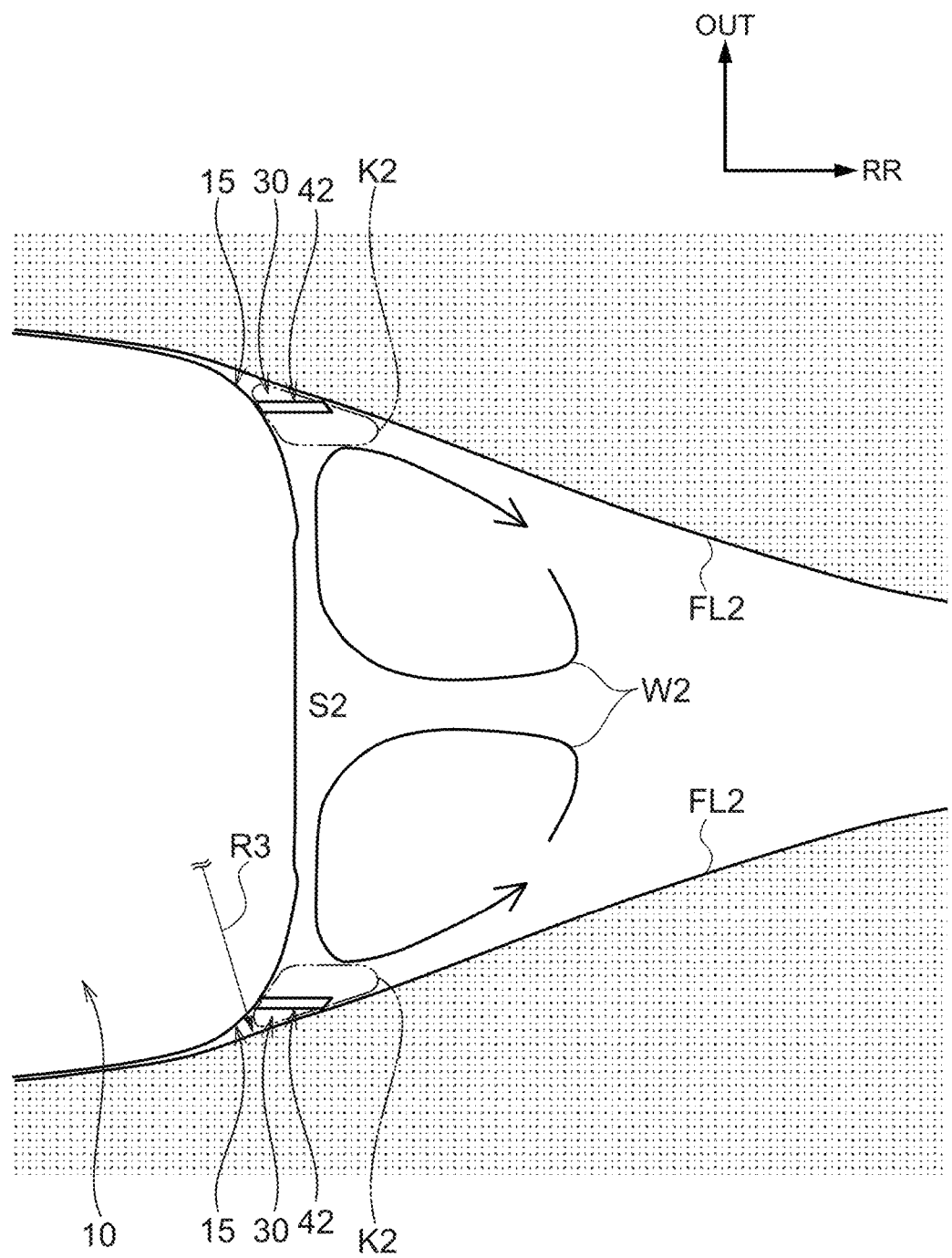
FIG. 6 is a descriptive diagram illustrating a state of airflows and rear face eddies in the vicinity of the vehicle rear end portion in accordance with the first exemplary embodiment.

FIG. 6 schematically illustrates, in a state viewed in a vehicle up-and-down direction, airflows and rear face eddies in the vicinity of the vehicle rear end portion during running of the vehicle 10. In FIG. 6, the airflows closest to the vehicle 10 are represented by solid lines as flow lines FL2; regions of other airflows are represented by stippling. Rear face eddies are represented by arrows marked W2. The rear face eddies W2 occur in a region S2 at the rear side in the vehicle front-and-rear direction than the vehicle rear end portion of the vehicle 10 so as to be symmetrical between left and right relative to the vehicle width direction center (between the top and bottom of FIG. 6).

At the vehicle rear portion structures 30, the moving bodies 42 protrude to the rear side in the vehicle front-and-rear direction than the vehicle rear end portion 14 at the vehicle width direction inner sides of the corner portions 15. Therefore, distances between locations at which the rear face eddies W2 occur and the moving bodies 42 are shorter than in the comparative example described above. Consequently, portions of the airflows along the flow lines FL2 along the side faces of the moving bodies 42 flow along with the flows of portions of the rear face eddies W2. Thus, it is easier for the airflows along the flow lines FL2 to flow together towards the rear face eddies W2 and shear energy is more likely to be transmitted from the airflows along the flow lines FL2 to the rear face eddies W2. Therefore, energy in the rear face eddies W2 is increased.

A spacing between the two moving bodies 42 in the vehicle width direction is smaller than a spacing between the two board members 212 according to the comparative example described above (see FIG. 13). Therefore, region S2 is narrower than region Si (see FIG. 13). Region S2 being narrower than region Si means that the sizes of the rear face eddies W2 are smaller than the sizes of the rear face eddies W1 (see FIG. 13). This means that the energy required to stably form the rear face eddies W2 can be smaller than in the comparative example. For these reasons, with the vehicle rear portion structures 30, the rear face eddies W2 may be stably formed in region S2 and a reduction of air pressure in the region S2 may be suppressed.

With the vehicle rear portion structures 30, because the rear face eddies W2 can be stably formed in region S2, it is harder for the airflows along the flow lines FL2 passing along the moving bodies 42 to recirculate into the rear face eddies W2. That is, entrainment of the airflows along the flow lines FL2 that have passed the moving bodies 42 may be reduced.

Further, at each vehicle rear portion structure 30, a radius of curvature R3 of the flow line FL2 at the edge of the moving body 42 (the region K2 circled by a two-dot chain line) is larger than the radius of curvature R1 in the comparative example (see FIG. 13). According to the principles of flow line curvature, the radius of curvature R3 of the flow line FL2 being larger signifies that the pressure in region K2 is higher than the pressure in region K1 of the comparative example (see FIG. 13). That is, states of high pressure in regions in the vicinities of the moving bodies 42 may be maintained.

As described above, with the vehicle rear portion structures 30, a reduction of air pressure in the region S2 and in the regions at the vehicle width direction outer sides than the moving bodies 42 is suppressed. That is, a reduction of air pressure in the vicinity of the vehicle rear end portion 14 of the vehicle 10 may be suppressed. Hence, because a reduction of air pressure in the vicinity of the vehicle rear end portion 14 is suppressed, the vehicle 10 tends to be pulled less to the rear side in the vehicle front-and-rear direction. That is, the air resistance of the vehicle 10 may be reduced.

In the vehicle rear portion structure 30 illustrated in FIG. 4, in the state in which the moving body 42 is disposed at the protruded position B, the LED lamp 56 (see FIG. 3) emits light to the rear side in the vehicle front-and-rear direction. Thus, because of the LED lamp 56 being provided at the moving body 42, the LED lamp 56 can be seen from behind the vehicle 10 even when the moving body 42 has moved in the vehicle front-and-rear direction. Therefore, visibility of the lamps from behind the vehicle 10 may be improved. Moreover, because the LED lamp 56 is provided at the moving body 42, the fact that the moving body 42 is present at the vehicle rear end portion 14 and the approximate shape of the moving body 42 may be recognized from behind the vehicle 10. Therefore, visibility of the moving body 42 may be improved.

Even in a case in which another lamp is provided at the corner portion 15 and a portion of light from the another lamp is blocked when the moving body 42 is at the protruded position B, the LED lamp 56 functions as a portion of the another lamp. Therefore, visibility of the another lamp from behind the vehicle 10 may be improved. Moreover, because the LED lamp 56 is provided at the moving body 42, the fact that the moving body 42 is present at the vehicle rear end portion 14 and the approximate shape of the moving body 42 may be recognized from behind the vehicle 10. Therefore, visibility of the moving body 42 may be improved.

In the vehicle rear portion structure 30, the lamp cover 54 (the emission face 54A) is exposed at the vehicle outside of the vehicle rear end portion 14 in the state in which the moving body 42 is disposed at the stowed position A of the vehicle rear end portion 14. Therefore, as described above, the LED lamp 56 and the lamp cover 54 may be employed as the tail stop lamp and the rear turn signal lamp. That is, because there is no need to provide the tail stop lamp and the rear turn signal lamp in addition to the LED lamp 56, a number of components in the vehicle 10 may be reduced compared to a structure in which the moving body 42 does not include the LED lamp 56 and the lamp cover 54.

In the vehicle rear portion structure 30, because the moving unit 40 is provided in the vicinity of the boundary between the luggage door 18 and the vehicle body 12, maintenance operations of the moving unit 40 may be performed by opening the luggage door 18. Therefore, maintenance operations of the moving unit 40 are easier than in a structure in which the moving unit 40 is provided at an alternative location.

Comparison of Cd Values

Now, Coefficient of Drag (Cd) values of the vehicle 10 according to the present exemplary embodiment and the vehicle according to the comparative example are described. A Cd value is an air resistance coefficient, representing a level of resistance that fluid around the vehicle 10 is subjected to. The Cd values are found by simulations based on numerical fluid dynamics.

As illustrated in FIG. 7, a length in the vehicle front-and-rear direction from the vehicle rear end portion 14 to the vehicle rear end portion of the moving body 42 (a protrusion length of the moving body 42) is represented by X, and a length in the vehicle width direction from the representative point P to the moving body 42 is represented by Y. Now, Cd values with X and Y being altered as variables are compared.

Figure 8A:
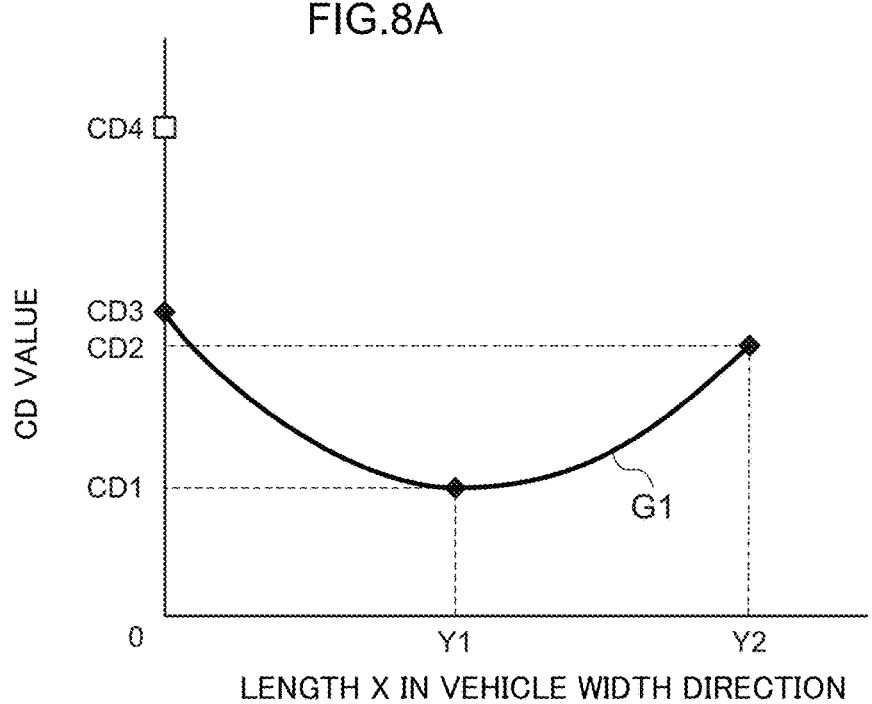
FIG. 8A is a graph illustrating a relationship between distances in the vehicle width direction of the moving body in accordance with the first exemplary embodiment from the representative point and Cd values.

FIG. 8A illustrates, in a graph G1, a relationship between Cd values and the distance Y mm in the vehicle width direction from the representative point P (see FIG. 7) to the moving body 42 if the length X in the vehicle front-and-rear direction from the vehicle rear end portion 14 to the vehicle rear end portion of the moving body 42 (see FIG. 7) is set at X2 mm. Graph G1 is an approximate curve obtained by the least squares method from Cd values Cd3, Cd1 and Cd2 when Y is varied to 0, Y1 and Y2 mm.

The plot at which Y=0 mm and the Cd value=Cd3 is a result for the vehicle 210 according to the comparative example described above (see FIG. 13). The plot at which Y=0 mm and the Cd value=Cd4 is a result for a vehicle according to an alternative comparative example (not shown in the drawings) in which X=0 mm; that is, a vehicle that does not include the board members 212 (see FIG. 13). Sizes of Y are such that 0<Y1<Y2. Sizes of the Cd values are such that Cd1<Cd2<Cd3<Cd4.

Looking at graph G1, it can be seen that Cd1 and Cd2 when Y is Y1 mm and Y2 mm for the vehicle 10 according to the present exemplary embodiment (see FIG. 1) are lower than Cd3 for the vehicle 210 according to the comparative example (see FIG. 13) and Cd4 according to the alternative comparative example. Because there is a minimum in the graph G1, at (Y1, Cd1), it can be seen that the Cd value increases also if the moving body 42 (see FIG. 2) is too close to the center in the vehicle width direction. This is probably because if the value of Y is large, the condition is close to a state in which the moving bodies 42 are not present in the vicinities of the two vehicle width direction end portions of the vehicle rear end portion 14 (see FIG. 1), the radius of curvature of the flow line of each airflow is small, and pressure in the region at the rear side relative to the vehicle rear end portion 14 drops.

Figure 8B:
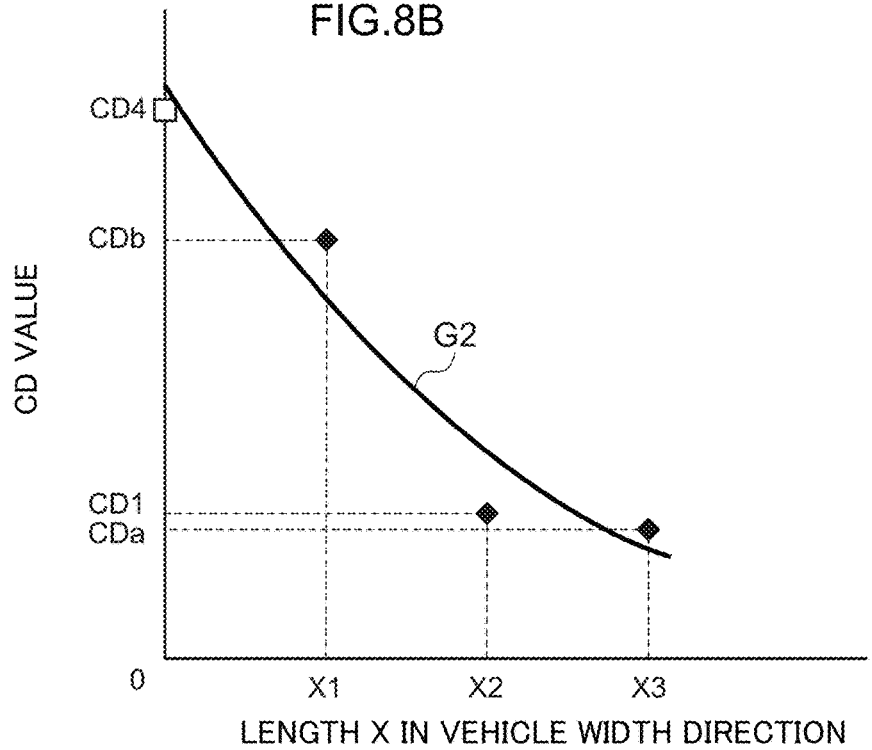
FIG. 8B is a graph illustrating a relationship between protrusion lengths in the vehicle front-and-rear direction of the moving body in accordance with the first exemplary embodiment and Cd values.

FIG. 8B illustrates, in a graph G2, a relationship between Cd values and the length X mm in the vehicle front-and-rear direction from the vehicle rear end portion 14 to the vehicle rear end portion of the moving body 42 (see FIG. 7) if the distance Y in the vehicle width direction from the representative point P (see FIG. 7) to the moving body 42 is set at Y1 mm. Graph G2 is an approximate curve obtained by the least squares method from Cd values Cd4, Cdb, Cd1 and Cda when X is varied to 0, X1, X2 and X3 mm. X=0 mm corresponds to the alternative comparative example mentioned above. Sizes of X are such that 0<X1<X2<X3. Sizes of the Cd values are such that Cda<Cd1<Cdb<Cd4. Looking at graph G2, it can be seen that the longer the length of the moving bodies 42 in the vehicle front-and-rear direction, the lower the Cd value.

Second Exemplary Embodiment

Now, a vehicle body front portion structure 100 according to a second exemplary embodiment is described. Structures that are the same as in the first exemplary embodiment are assigned the same reference numerals and, as appropriate, are not described. The meaning of "structures that are the same" includes structures whose basic functions are the same even if lengths and shapes of portions thereof are different.

Figure 9:
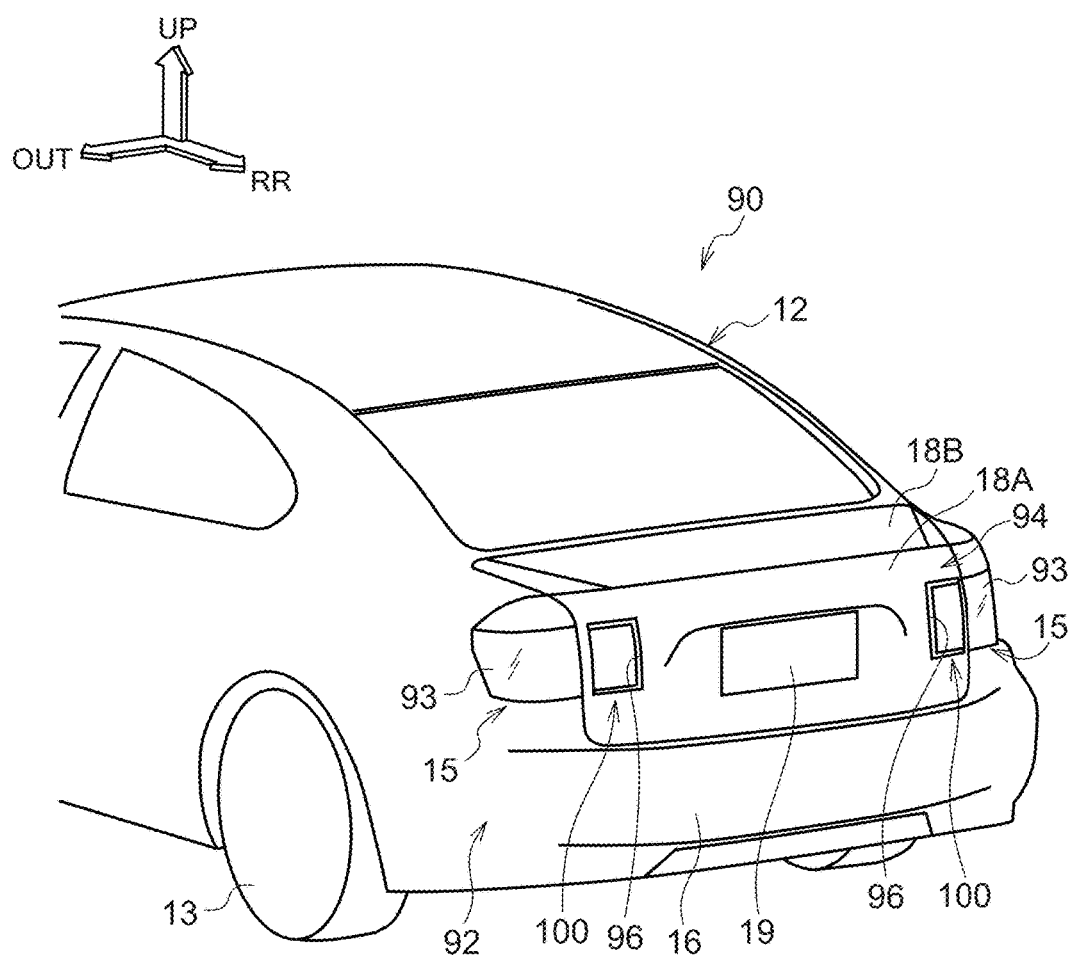
FIG. 9 is a perspective view, viewed from a vehicle rear end portion side, of a vehicle in which a vehicle rear portion structure in accordance with a second exemplary embodiment is applied.

As illustrated in FIG. 9, vehicle rear portion structures 100 according to the second exemplary embodiment are provided at a vehicle 90. In the vehicle 90, the vehicle 10 (see FIG. 1) is provided with a lamp 93 at each of the two corner portions 15 and a luggage door 94 is provided instead of the luggage door 18 (see FIG. 1). That is, structures of the vehicle 90 apart from the lamps 93, the luggage door 94 and the vehicle rear portion structures 100 are substantially the same as the structures of the vehicle 10.

The rear end portion in the vehicle front-and-rear direction of the vehicle body 12 of the vehicle 90 is collectively referred to as a vehicle rear end portion 92. The vehicle rear end portion 92 includes the rear bumper 16, a rear end portion in the vehicle front-and-rear direction of the luggage door 94, and the vehicle rear portion structures 100. The vehicle rear end portion 92 is basically structured with left-right symmetry with respect to the vehicle width direction center. Accordingly, in the following descriptions, structures at the left side relative to the vehicle width direction center of the vehicle rear end portion 92 are described but descriptions are not given of structures at the right side of the vehicle rear end portion 92. Details of the vehicle rear portion structures 100 are described below.

Viewed in the vehicle up-and-down direction, each lamp 93 is curved so as to protrude to the opposite side from the side thereof at which the vehicle rear portion structure 100 is disposed. The lamp 93 functions as a tail stop lamp and a rear turn signal lamp.

Figure 10:
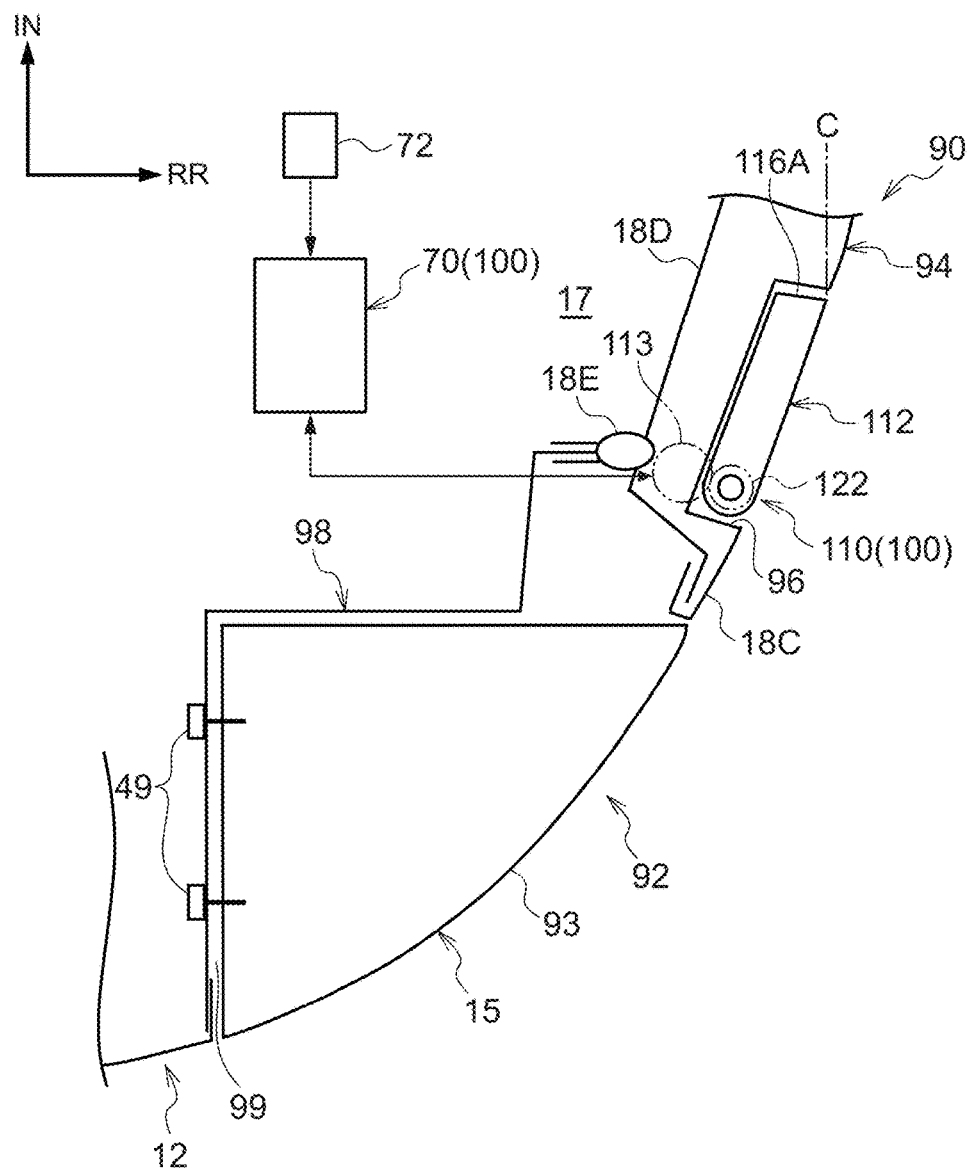
FIG. 10 is a schematic structural diagram illustrating, in a vehicle plan view, a state in which a moving body of the vehicle rear portion structure in accordance with the second exemplary embodiment is disposed at a stowed position.

The luggage door 94 opens and closes the luggage space 17 (see FIG. 10). The luggage door 94 is a structure in which recess portions 96 that are recessed to the front side in the vehicle front-and-rear direction (i.e., opened to the rear side) are formed at two locations, at two vehicle width direction end portions of the vertical wall portion 18A of the luggage door 18 (see FIG. 1). Viewed in the vehicle front-and-rear direction, each recess portion 96 in the luggage door 94 is formed in a square shape.

As illustrated in FIG. 10, as viewed in the vehicle up-and-down direction of the vehicle 90 (in a plan view), an inner panel 98 that structures a portion of each corner portion 15 is inflected at plural locations. A space portion 99 that is cut away in an "L" shape is formed at each of the two end portions in the vehicle width direction, at the rear end portion in the vehicle front-and-rear direction of the vehicle body 12. The lamp 93 is disposed in the space portion 99, and the lamp 93 is fixed to the inner panel 98 by a plural number of the bolts 49.

Vehicle Rear Portion Structure

As illustrated in FIG. 10, each vehicle rear portion structure 100 includes a moving unit 110 and the control unit 70.

Moving Unit

The moving unit 110 illustrated in FIG. 10 includes a moving body 112 that serves as an example of the moving portion, which is stowed in the recess portion 96, and a motor 113 that causes (moves) the moving body 112 to be stowed in and protruded from the recess portion 96. In this example, in the state in which the moving body 112 is stowed in the recess portion 96, a vehicle width direction inner side end portion of the moving body 112 is disposed at the rear side in the vehicle front-and-rear direction relative to an outer side end portion of the same. The moving body 112 is disposed at the vehicle width direction inner side of the corner portion 15 (of both of the corner portions 15) in the vehicle width direction. Specifically, the moving unit 110 is provided at the luggage door 94 in the vicinity of a boundary between the luggage door 94 and the vehicle body 12. As is described in detail below, the moving body 112 is a member for regulating airflow at the vehicle rear.

Moving Body

Figure 11:
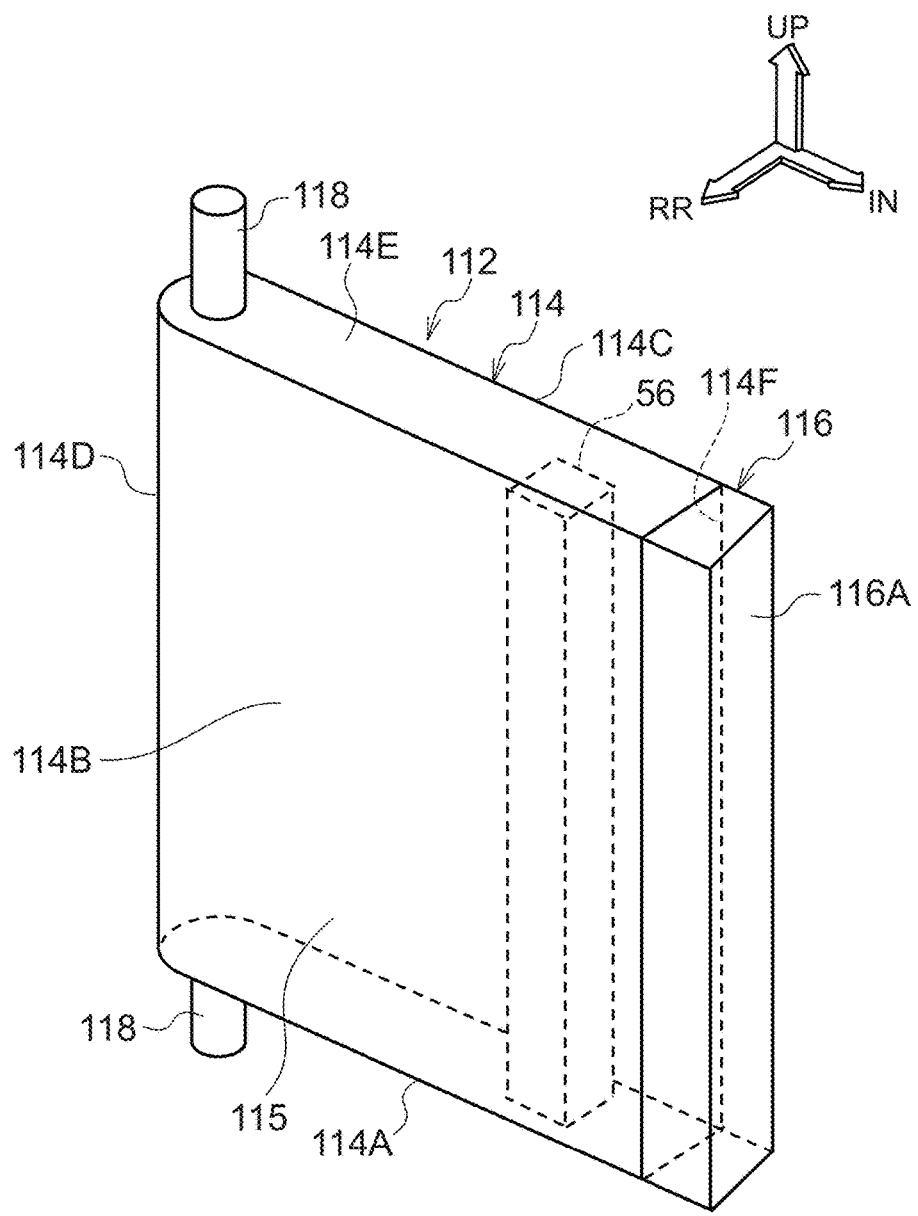
FIG. 11 is a perspective view of the moving body in accordance with the second exemplary embodiment.

As illustrated in FIG. 11, the moving body 112 includes a hollow housing 114, a lamp cover 116 and the LED lamp 56. The lamp cover 116 is mounted at a vehicle width direction inner side end portion of the housing 114. The LED lamp 56 is mounted at the inside of the housing 114. Descriptions of the dispositions of the respective members structuring the moving body 112 are now given for a state in which the largest side faces of the moving body 112 are disposed along the vehicle width direction.

The housing 114 is a box body that is disposed with a thickness direction thereof in the vehicle front-and-rear direction. The housing 114 is formed of, for example, a black polycarbonate resin. Specifically, the housing 114 includes a lower wall 114A, a side wall 114B, a side wall 114C, a front wall 114D and an upper wall 114E. Thicknesses of the lower wall 114A, side wall 114B, side wall 114C, front wall 114D and upper wall 114E are not illustrated in FIG. 11.

Viewed in the vehicle up-and-down direction, the lower wall 114A is formed in a rectangular shape. The side wall 114B and the side wall 114C stand upright in the vehicle up-and-down direction at each of two vehicle front-and-rear direction end portions of the lower wall 114A. The side wall 114B includes a side face 115 that is disposed at the vehicle width direction outer side, in a state in which the moving body 112 is disposed at a protruded position D (see FIG. 12), which is described below. The side face 115 is an example of the wall face that extends in the vehicle front-and-rear direction and the vehicle up-and-down direction.

The front wall 114D is a curved wall formed in a shape that protrudes toward the vehicle width direction outer side, standing upright in the vehicle up-and-down direction at a vehicle width direction outer end portion of the lower wall 114A. The upper wall 114E has substantially the same size and shape as the lower wall 114A, and opposes the lower wall 114A in the vehicle up-and-down direction. An aperture portion 114F is formed at the inner side end in the vehicle width direction of the housing 114. The aperture portion 114F opens to the inner side in the vehicle width direction.

Axle portions 118 are formed protruding to the lower side and the upper side in the vehicle up-and-down direction at vehicle width direction outer side end portions of the lower wall 114A and upper wall 114E. The axle portions 118 serve as an example of a turning axle, and have the axle along the vehicle up-and-down direction. The axle portions 118 are turnably disposed in an upper wall and a lower wall, which are not shown in the drawings, of the recess portion 96 in the luggage door 94 (see FIG. 10), which walls oppose one another in the vehicle up-and-down direction. That is, the moving body 112 is provided to be turnable relative to the luggage door 94 via the axle portions 118. A gear 122 (see FIG. 10) is mounted at the axle portions 118. The gear 122 is driven to turn by the motor 113. The gear 122 is not shown in FIG. 11.

The lamp cover 116 is, for example, a column-shaped body whose length in the vehicle front-and-rear direction is substantially the same as the length in the vehicle front-and-rear direction of the housing 114, and whose length in the vehicle up-and-down direction is substantially the same as the length in the vehicle up-and-down direction of the housing 114. The lamp cover 116 is fixed to the inner side end in the vehicle width direction of the housing 114 by adhesion or the like and covers the aperture portion 114F. The lamp cover 116 is formed of, for example, a colorless, transparent polycarbonate resin.

An emission face 116A, through which light from the LED lamp 56 is emitted, is formed at the inner side end in the vehicle width direction of the lamp cover 116. That is, the lamp cover 116 is structured to guide light from the LED lamp 56 to the emission face 116A such that the light of the LED lamp 56 is emitted through the emission face 116A to the outside. Viewed in the vehicle up-and-down direction, the emission face 116A is formed as, for example, a taper surface along a direction intersecting the vehicle front-and-rear direction.

As an example, the upper side in the vehicle up-and-down direction of the lamp cover 116 is colored red and the lower side is colored orange. A boundary face between the red and orange parts of the lamp cover 116 is not shown in FIG. 11. The shape and disposition of the lamp cover 116 are such that, in a state in which the moving body 112 is disposed at a stowed position C (see FIG. 10), which is described below, the emission face 116A is not exposed to the vehicle outside of the vehicle rear end portion 92 (see FIG. 10).

Motor

The motor 113 illustrated in FIG. 10 starts driving and stops driving in accordance with commands from the control unit 70. The motor 113 turns the gear 122 in either a forward turning direction or a reverse turning direction, so as to protrude (move) a portion of the moving body 112 to the outside from the recess portion 96 or stow (move) the portion of the moving body 112 into the recess portion 96. The motor 113 and the gear 122 are encompassed by the example of the control section.

Positions of the Moving Body

Figure 12:
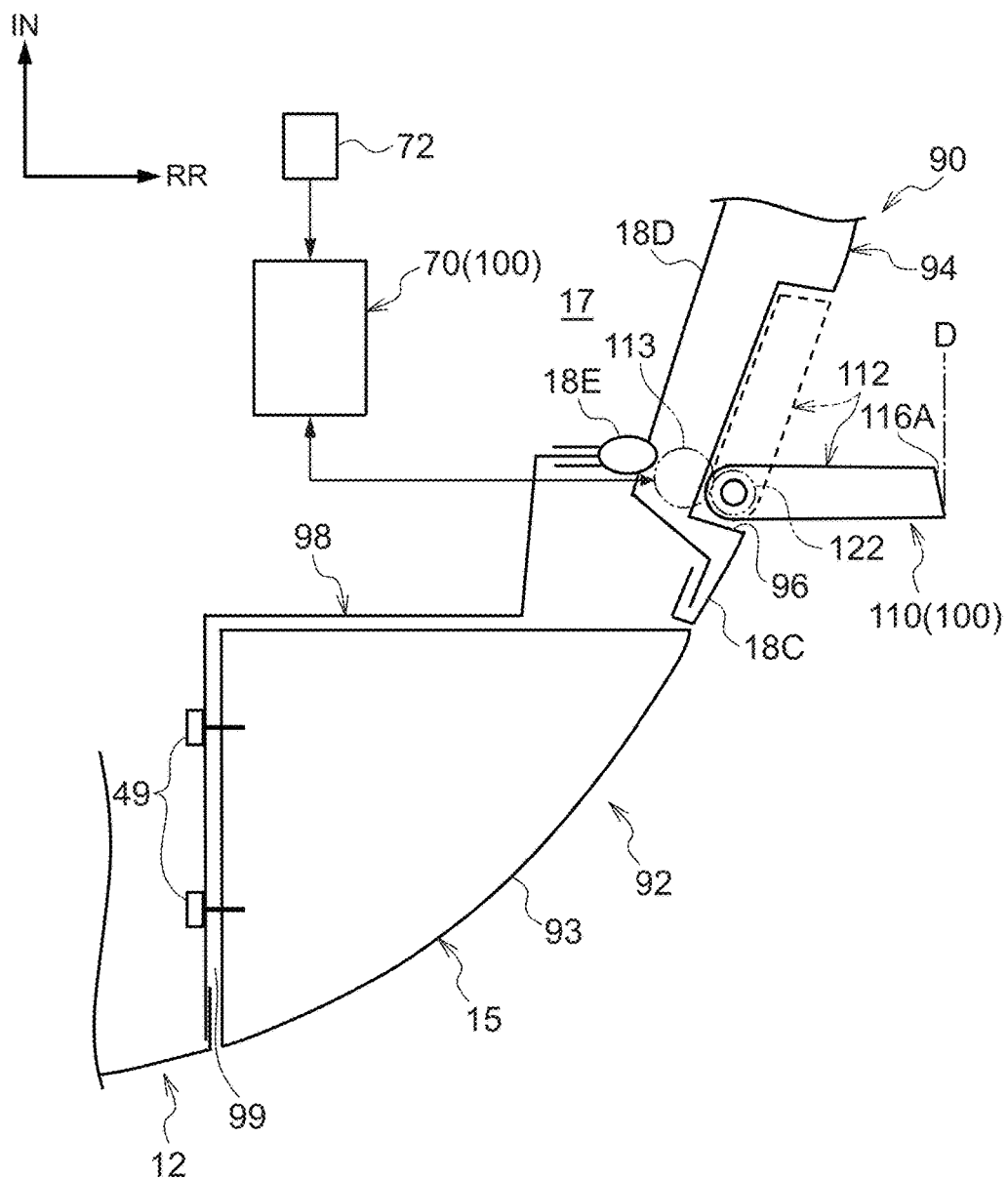
FIG. 12 is a schematic structural diagram illustrating, in a vehicle plan view, a state in which the moving body of the vehicle rear portion structure in accordance with the second exemplary embodiment is disposed at a protruded position.

As illustrated in FIG. 10, a position of the moving body 112 in the state in which the moving body 112 is stowed in the recess portion 96 and the vehicle width direction inner side end portion of the moving body 112 is disposed at the rear side in the vehicle front-and-rear direction relative to the outer side end portion thereof is referred to as "the stowed position C". In FIG. 10, the stowed position C is marked at a position at the vehicle rear end of the moving body 112. On the other hand, as illustrated in FIG. 12, a position of the moving body 112 in a state in which the moving body 112, from a vehicle front-and-rear direction central portion to a rear end portion thereof, is protruded to the rear side in the vehicle front-and-rear direction than the recess portion 96 is referred to as "the protruded position D". In FIG. 12, the protruded position D is marked at a position at the vehicle rear end of the moving body 112. The moving body 112 is disposed at the vehicle width direction inner side relative to the representative point P (see FIG. 7).

Control Unit

As illustrated in FIG. 10 and FIG. 12, in the aforementioned initial state of the vehicle 90 or a low-speed running state in which the vehicle speed of the vehicle 90 is not more than the specific speed, the control unit 70 drives and stops the motor 113 such that the moving body 112 is disposed at the stowed position C. In a high-speed running state in which the vehicle speed of the vehicle 90 is above the specific speed, the control unit 70 drives and stops the motor 113 so as to turn the moving body 112 about the axle portions 118 to move the position of the moving body 112 from the stowed position C to the protruded position D.

Operation and Effects

Now, operation and effects of the vehicle rear portion structure 100 according to the present exemplary embodiment are described.

With the vehicle rear portion structures 100, when the vehicle 90 is stopped or running at not more than the specific speed, each moving body 112 is disposed at the stowed position C as illustrated in FIG. 10. The emission face 116A is exposed at the vehicle outside of the vehicle rear end portion 92. In this state, the control unit 70 controls lighting, flashing and extinguishing of the lamp 93 on the basis of operations by a vehicle occupant. Because the lamp 93 is exposed at the vehicle outside of the vehicle rear end portion 92, conditions of visibility of the lamp 93 are assured.

When the vehicle 90 is stopped or running at not more than the specific speed, proportional increases in air resistance acting on the vehicle 90 with respect to vehicle speeds are small. Therefore, even though the moving bodies 112 are each disposed at the stowed position C, the magnitude of air resistance acting on the vehicle 90 has little effect on the running of the vehicle 90. When the vehicle 90 is moving to the rear side (reversing), because each moving body 112 is disposed at the stowed position C, the moving body 112 may be prevented from coming into contact with an object at the rear side of the vehicle 90. Furthermore, when the vehicle 90 is stopped, because each moving body 112 is disposed at the stowed position C, the moving bodies 112 do not impede operations when the luggage door 94 is opened and luggage is put into or taken out of the luggage space 17.

Hence, if the speed sensor 72 detects that the vehicle speed of the vehicle 90 is above the specific speed, the control unit 70 drives each motor 113, causing the gear 122 to turn forward and moving the position of the moving body 112 from the stowed position C to the protruded position D as illustrated in FIG. 12. As a result, the moving bodies 112 protrude to the rear side in the vehicle front-and-rear direction than the vehicle rear end portion 92, at the vehicle width direction inner sides relative to the corner portions 15.

Because each emission face 116A is exposed to the vehicle outside of the vehicle rear end portion 92 when the moving body 112 is disposed at the protruded position D, the moving body 112 functions as the tail stop lamp and the rear turn signal lamp. In this state, the moving body 112 may block a portion of light from the lamp 93, but the emission face 116A may be seen from behind the vehicle 90. Further, the moving body 112 functions as a portion of the lamp 93. Therefore, because the moving body 112 can be seen from a region in which a portion of light from the lamp 93 is blocked by the moving body 112, light similar to the lamp 93 can be seen. That is, visibility of the tail stop lamp and the rear turn signal lamp from behind the vehicle 10 may be improved. Moreover, because the LED lamp 56 is provided at the moving body 112, the fact that the moving body 112 is present at the vehicle rear end portion 92 and the approximate shape of the moving body 112 may be recognized from behind the vehicle 90. Therefore, visibility of the moving body 112 may be improved.

In the vehicle rear portion structures 100, the moving bodies 112 protrude to the rear side in the vehicle front-and-rear direction relative to the vehicle rear end portion 92 at the vehicle width direction inner sides of the corner portions 15 of the vehicle rear end portion 92. Therefore, similar operations to the moving bodies 42 described above (see FIG. 6) may be obtained and a reduction of air pressure in the vicinity of the vehicle rear end portion 92 of the vehicle 90 during running may be suppressed. That is, the vehicle 90 tends to be pulled less to the rear side in the vehicle front-and-rear direction, and the air resistance of the vehicle 90 may be reduced.

In each vehicle rear portion structure 100, the moving body 112 turns about the axle portions 118 (see FIG. 11) to move from the stowed position C to the protruded position D. Therefore, a length in the vehicle front-and-rear direction of a space required for stowing the moving body 112 may be made shorter than in a structure in which the moving body 112 moves along the vehicle front-and-rear direction when the moving body 112 is being protruded to the rear side in the vehicle front-and-rear direction from the vehicle rear end portion 92. Therefore, the luggage space 17 may be thoroughly assured.

In the vehicle rear portion structure 100, because the moving unit 110 is provided in the luggage door 94, maintenance operations of the moving unit 110 may be performed by opening the luggage door 94. Therefore, maintenance operations of the moving unit 110 are easier than in a structure in which the moving unit 110 is provided at an alternative location.

Variant Examples

In the present exemplary embodiments the vehicle rear portion structures 30 and 100 are employed with the same structures at both sides of the vehicle width direction, but this is not limiting. Structures may be employed that are different at one side and the other side of the vehicle width direction. For example, the vehicle rear portion structure 30 may be employed at one side of the vehicle width direction and the vehicle rear portion structure 100 may be employed at the other side.

The vehicle rear portion structure 30 or 100 may be a structure in which the lamp cover 54 or 116 is not provided but light is emitted directly through the aperture portion 52F or 114F of the housing 52 or 114. Alternatively, the housing 52 or 114 may be constituted of a transmissive member that transmits light and light may be emitted through plural surfaces of the moving body 42 or 112. Furthermore, the moving body 42 or 112 is not limited to being constituted of a polycarbonate resin but may be constituted of an acrylic resin, a metal or the like.

The light-emitting portion is not limited to the LED lamp 56 but may be an ordinary light bulb such as an incandescent light bulb or the like. The number and arrangement direction of the lamps structuring the light-emitting portion are not particularly limited. For example, a construction in which plural lamps are arranged in the vehicle width direction or the vehicle front-and-rear direction, a construction that is structured by a single lamp, or the like may be employed.

In the vehicle 10 according to the first exemplary embodiment, the moving unit 110 may be provided instead of the moving unit 40. The moving body 42 that moves in the vehicle front-and-rear direction may be provided at a vehicle width direction central portion or inner side end portion of the lamp 93 according to the second exemplary embodiment. The moving body 112 may also be provided at a vehicle width direction central portion or inner side end portion of the lamp 93.

Hereabove, the vehicle rear portion structure has been described in accordance with the exemplary embodiments and variant examples of the present disclosure, but the exemplary embodiments and variant examples may be employed in suitable combinations, and it will be clear that numerous modes may be embodied within a technical scope not departing from the gist of the present disclosure.

What is claimed is:

1. A vehicle rear portion structure comprising:
    a moving portion that is disposed at a vehicle rear end portion at a vehicle width direction inner side of each of two corner portions of the vehicle width direction, the moving portion including a wall face that extends in a vehicle front-and-rear direction and a vehicle up-and-down direction, and the moving portion being movable to a stowed position at which the moving portion is stowed in the vehicle rear end portion and to a protruded position at which the moving portion protrudes from the stowed position to a rear side in the vehicle front-and-rear direction;
    a control section that moves the moving portion from the stowed position to the protruded position in a case in which a speed of the vehicle exceeds a specific speed; and
    a light-emitting portion that is disposed at the moving portion and emits light to the rear side in the vehicle front-and-rear direction relative to the vehicle rear end portion.

2. The vehicle rear portion structure according to claim 1, wherein the moving portion comprises a light guide member that is exposed to a vehicle outside of the vehicle rear end portion when the moving portion is disposed at the stowed position, the light guide member guiding light from the light-emitting portion to the rear side in the vehicle front-and-rear direction.

3. The vehicle rear portion structure according to claim 1, wherein
    the vehicle rear end portion includes a luggage door,
    the moving portion is disposed at the luggage door via a turning axle, an axial direction of which is in the vehicle up-and-down direction, and
    the control section causes the moving portion to turn about the turning axle and move from the stowed position to the protruded position.

4. The vehicle rear portion structure according to claim 1, wherein the control section causes the moving portion to translate in the vehicle front-and-rear direction and move from the stowed position to the protruded position.

* * * * *